(12) United States Patent
Liang

(10) Patent No.: US 6,616,406 B2
(45) Date of Patent: Sep. 9, 2003

(54) AIRFOIL TRAILING EDGE COOLING CONSTRUCTION

(75) Inventor: George Liang, Palm City, FL (US)

(73) Assignee: ALSTOM (Switzerland) Ltd, Baden (CH)

( * ) Notice: Subject to any disclaimer, the term of this patent is extended or adjusted under 35 U.S.C. 154(b) by 0 days.

(21) Appl. No.: 09/877,042

(22) Filed: Jun. 11, 2001

(65) Prior Publication Data

US 2002/0187043 A1 Dec. 12, 2002

(51) Int. Cl.[7] ................................................. F01D 5/18
(52) U.S. Cl. ...................................................... 416/97 R
(58) Field of Search ............................ 416/96 R, 96 A, 416/97 R; 415/115, 116

(56) References Cited

U.S. PATENT DOCUMENTS

| | | |
|---|---|---|
| 2,763,920 A | 9/1956 | Turner, Jr. et al. |
| 3,045,965 A | 7/1962 | Bowmer |
| 4,601,638 A | 7/1986 | Hill et al. |
| 5,368,441 A | 11/1994 | Sylvestro et al. |
| 5,378,108 A | 1/1995 | Zelesky |
| 5,772,397 A | 6/1998 | Morris et al. |
| 5,857,837 A | 1/1999 | Zelesky et al. |
| 6,004,100 A | 12/1999 | Przirembel et al. |
| 6,234,754 B1 | 5/2001 | Zelesky et al. |

FOREIGN PATENT DOCUMENTS

| | | |
|---|---|---|
| DE | 25 55 049 | 6/1976 |
| EP | 0 896 127 A2 | 2/1999 |
| EP | 0 978 634 A1 | 2/2000 |

Primary Examiner—Edward K. Look
Assistant Examiner—Dwayne J. White
(74) Attorney, Agent, or Firm—Burns, Doane, Swecker & Mathis, L.L.P.

(57) ABSTRACT

An airfoil in a gas turbine comprises an improved cooling construction at its trailing edge providing impingement as well as enhanced film cooling. The airfoil comprises cavities arranged between the suction and pressure side wall for a cooling fluid and exit passages leading from the cavities to exit ports positioned on the pressure side wall. According to the invention the suction side wall is shaped such that the tip portion of the trailing edge has a cross-section comprising a part of a circle that is equal or greater than a semi-circle extending from the suction side around the tip to the pressure side and beyond into the exit passage. The exit passages comprise a bend in the region of the tip where they form an exit plenum for the cooling fluid to diffuse further.

10 Claims, 1 Drawing Sheet

AIRFOIL TRAILING EDGE COOLING CONSTRUCTION

FIELD OF THE INVENTION

This invention pertains to airfoils in gas turbines and in particular to cooling of the airfoil trailing edge.

BACKGROUND OF THE INVENTION

Airfoils of gas turbines, turbine rotor blades and stator vanes, require extensive cooling in order to prevent damage due to overheating. Typically such airfoils are designed with a plurality of passages and cavities arranged spanwise from the root to the tip of the airfoil for cooling fluid to flow through. The cooling fluid is typically air bled from the compressor having a higher pressure and lower temperature compared to the gas traveling through the turbine. The higher pressure forces the air through the cavities and passages as it transports the heat away from the airfoil walls. The cooling air finally leaves the airfoil by means of exit slots along the sidewalls and at the trailing edge of the airfoil. The cooling of the airfoil material by a cooling construction of passages and cavities occurs by several different physical means such as film cooling, impingement cooling, and diffusion.

The trailing edge of the airfoil is particularly difficult to cool for several reasons. First, the cooling air has an increased temperature by the time it reaches the trailing edge reducing the temperature difference between it and the material to be cooled. Second, the material of the trailing edge is relatively thin such that it is especially susceptible to thermal stress and damage due to overheating.

Furthermore, efforts have been made to minimize the thickness of the trailing region in order to improve the aerodynamics of the airfoil. A thin trailing edge presents less blockage to the working fluid and as such reduces the pressure loss allowing a greater turbine performance. Hence, as the airfoil's aerodynamics is improved by the reduction of the edge thickness the cooling of the airfoil material becomes a greater challenge.

The German patent DE 25 55 049 (U.S. Pat. No. 4,153, 386) discloses an example of an airfoil with a trailing edge having a passageway for cooling fluid leading from an internal cavity to an exit slot. Rectangular corners shape the end portion of the trailing edge with the exit slot. The finite thickness and sharp corners of the end portion cause vortices about the exit slot so that the cooling effectiveness is compromised. Subsequently, a large amount of cooling fluid is necessary in order to effect a sufficient reduction of the edge temperature.

U.S. Pat. No. 4,601,638 discloses an improved design for the trailing edge of a gas turbine airfoil for an aero engine with spanwise arranged channels leading from internal cavities to exit slots. The exit slots for the cooling fluid are arranged on the pressure side of the airfoil. Here a so-called cutback distance is defined as the distance from the tip of the airfoil to the edge of an exit slot on the pressure side that is farthest away from the airfoil trailing edge. The design includes in particular a ratio t/s of the pressure side lip thickness t to the width of the cooling fluid channel s that is equal to or less than 0.7. For a blade with a given nominal pressure side lip thickness t of 0.035 inches and a tailing edge thickness d of 0.08 inch this ratio t/s results in a cutback distance equal to or greater than 0.24 inches. In other words, the constraint on the ratio t/s results in a constraint on the minimal cutback distance.

U.S. Pat. No. 6,004,100 discloses another cooling construction for a gas turbine airfoil trailing edge in an aero engine with similar cavities and channels leading to cooling ports on the pressure wall side through which the cooling fluid exits the airfoil. The channels leading from an internal cavity to the cooling port each have a specially designed cross-section comprising a pair of fillets. In a further development the channels each comprise a jog in order to prevent high cycle fatigue along the narrow edge. The design allows in particular the cutback distance to extend all the way to the tip of the airfoil. The thin resulting walls can lead to problems in production of the airfoil.

SUMMARY OF THE INVENTION

It is the object of this invention to provide an airfoil for a gas turbine with a cooling construction for its trailing edge by which component life as well as turbine performance are improved over the state of the art.

In particular, it is the object of this invention to provide an airfoil with a minimized edge thickness and with a cooling construction for its trailing edge that sufficiently cools the trailing edge with a minimized amount of cooling fluid.

An airfoil attached to a rotor in a gas turbine comprises a pressure sidewall and a suction sidewall each with an inner and outer surface. One or more cavities are arranged spanwise, and/or radially, between the two suction and pressure sidewall. A cooling fluid bled from a cooling fluid source flows through the cavities. Furthermore, a plurality of exit passages is arranged within the airfoil, which lead from the cavities to exit ports positioned on the pressure sidewall and near the trailing edge of the airfoil. The exit passages are delimited in part by the inner surfaces of the suction side wall and a pressure side lip, that is the end portion of the pressure side wall that leads up to the exit ports at the trailing edge. The suction sidewall extends such that it forms the tip of the trailing edge of the airfoil.

According to the invention the suction sidewall is shaped such that the tip of the airfoil trailing edge has a cross-section that comprises a part of a circle whereas the part of the circle is equal to or less than a semi-circle. The part of the circle extends from the suction side of the airfoil around the tip of the airfoil to the pressure side of the airfoil and beyond into the exit passage. The exit passages each comprise a bend in the region of the airfoil trailing edge tip toward the pressure side where the exit passages form an exit plenum for the cooling fluid to diffuse and cool the airfoil trailing edge.

The invention is thus based on a multi-diffusion concept, and is produced by the diffusion of the cooling fluid flow form the several exit passages into the large exit plenum about the bend region of the several exit passages. This is in particular realized by the rounded shape of the tip region according to the invention of the suction sidewall of the airfoil.

The tip of the airfoil trailing edge according to the invention has a cross-sectional shape in the likeness of a nose. Cooling fluid flows from the internal cavities through the exit passages towards the exit ports. As it reaches the region of the nose-shaped tip it also encounters the bend of the passages, which is delimited by the inner surface of the suction sidewall. The cooling fluid impinges on the inner surface of the suction sidewall and cools by impingement cooling the trailing edge tip region of the airfoil. Following the bend of the inner surface of the suction sidewall it flows toward the exit port on the pressure sidewall. It flows into an exit plenum in the region of the bend and the pressure side lip, diffuses and cools by film cooling the rounded the tip of the airfoil. The tip of the trailing edge is thus cooled by impingement as well as by film cooling.

In the longitudinal direction of the airfoil a multitude of exit passages lead onto the exit plenum on the pressure side of the airfoil. The exit plenum on the pressure side is enlarged compared to cooling constructions of the state of the art and thus allows a greater diffusion of the cooling fluid. Due to the relatively large size of the exit plenum the velocity of the cooling fluid flow is reduced which enhances the film cooling effectiveness. The nose-like shape of the airfoil trailing edge tip further effects that the cooling fluid follows the surface of the airfoil tip while cooling it whereas few or no vortices can form which would impede the cooling effectiveness. This further improves the film cooling effectiveness and as a result lowers the amount of necessary cooling fluid.

The cooling of the airfoil trailing edge is enhanced by film cooling of the tip on one hand and by impingement of the inner surface of the tip on the other. This enables the construction of the airfoil trailing edge with a smaller thickness by which the aerodynamics of the airfoil and as a result the performance of the turbine are improved.

Furthermore, there is a cutback distance equal to the distance between the tip of the trailing edge and the end of the pressure side lip. This design of the exit passages with a bend and a rounded shape of the tip effectively shortens the cutback distance. Calculations have shown that a reduction of the cutback distance improves the film cooling effectiveness. As a result, this feature reduces the amount of necessary cooling fluid.

In a particular embodiment of the invention the exit passages leading to the exit ports have a cross-section perpendicular to the cooling fluid flow that is circular, rectangular with rounded corners, or oblong. The sidewalls of the passage are diffused in the direction of the cooling fluid flow such that the flow velocity of the cooling fluid is further reduced and the film cooling effectiveness is enhanced.

In a particular embodiment of the invention the diffusion angle of the exit passage is less than three degrees. Calculations have shown that for this amount of diffusion the cooling effectiveness is optimized. In particular, for the range of the ratio of the length to the diameter of the cooling channel that is given for a typical airfoil a diffusion angle of less than three degrees prevents internal flow separation and a higher loss coefficient.

The exit passages lead onto a large exit plenum. For structural strength of the airfoil supporting ribs are arranged in this region substantially parallel to the exit passages. The supporting ribs are arranged every two or more exit passages. For example, four exit passages extend to the bend and onto pressure side of the airfoil whereas the first and fourth exit passages are adjoined on one side by a supporting rib that extends to the tip portion of the trailing edge of the airfoil. The large exit plenums are formed between such supporting ribs. In these exit plenums the cooling fluid can diffuse not only in the direction toward the trailing edge tip but also in the radial directions. Within this exit plenum a mixing of the cooling fluid with mainstream gas flow and the formation of vortices are mostly prevented enhancing the film cooling effectiveness.

In a particular embodiment of the invention the size of the cutback is less than 0.12 inches. This shortened cutback distance contributes to the increased film cooling effectiveness. Furthermore, the current invention yields a smaller cutback with a larger trailing edge thickness.

In a further embodiment of the invention the airfoil surface is provided with a protective coating. The coating is applied to the outer surface of the pressure sidewall and the suction sidewall. The coating serves as protection against erosion, corrosion and oxidation. It is applied with a large thickness of 0.014 to 0.018 inches, which provides a longer oxidation life and hence a significantly greater component life as the component life increases exponentially with the coating thickness.

The thickness of the airfoil trailing edge is reduced compared to designs of the state of the art. A thin trailing edge thickness according to the invention can accommodate a thick protective coating while the thickness of the resulting trailing edge remains still smaller than those of the state of the art and presents reduced blockage to the gas flow.

Furthermore, the design according to the current invention has a relatively large exit plenum such that the protective coating can be accommodated without blocking and impeding the flow of the cooling fluid out of the exit port.

In a particular embodiment of the invention the pressure side lip thickness is equal to or greater than 0.035 inch and the trailing edge diameter, that is the diameter of the nose-shaped airfoil tip, is equal to or greater than 0.08 inch.

In a further particular embodiment of the invention the exit port of the exit passage has a width equal to or less than 0.08 inch.

In a further particular embodiment of the invention the ratio of the pressure side lip thickness to the height of the cooling fluid exit passage is greater than 0.7.

BRIEF DESCRIPTION OF THE DRAWINGS

A preferred embodiment of the invention is described herein, with reference to the accompanying drawings, in which.

DETAILED DESCRIPTION OF THE INVENTION

Figure 1:
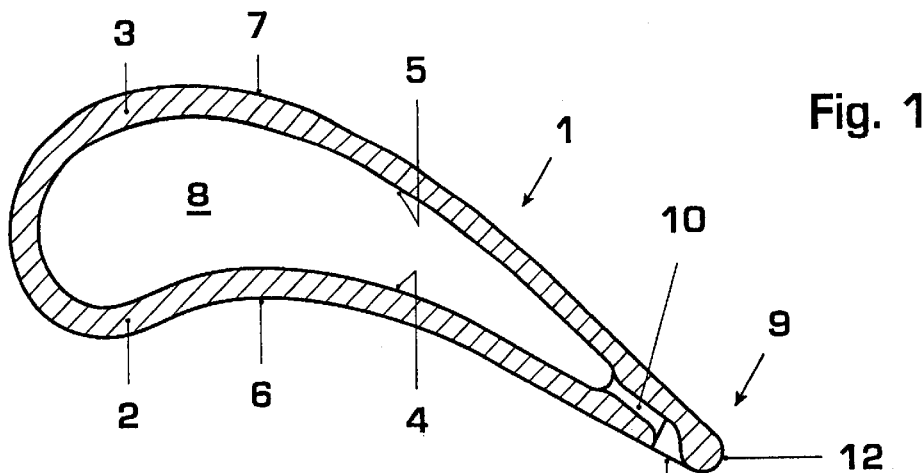
FIG. 1 is a cross-sectional view parallel to the rotor axis of an air cooled airfoil, in accordance with this invention.

FIG. 1 shows the cross-section of a typical gas turbine airfoil 1 with a pressure sidewall 2 and a suction side wall 3. The pressure side wall 2 and suction side wall 3 each have an inner surface 4,5 and an outer surface 6, 7 whereas the inner surfaces 4, 5 delimit a hollow space 8 for cooling fluid to flow through. At the trailing edge 9 of the airfoil 1 an exit passage 10 leads from the hollow space 8 to an exit port 11 of the airfoil. The exit passage is shaped in particular with a bend, which directs the passage 10 toward the exit ports 11 on the pressure side 2 of the airfoil 1. The cooling fluid flows from the hollow space 8 through the exit passage 10 and exits onto the pressure side 2.

Figure 2:
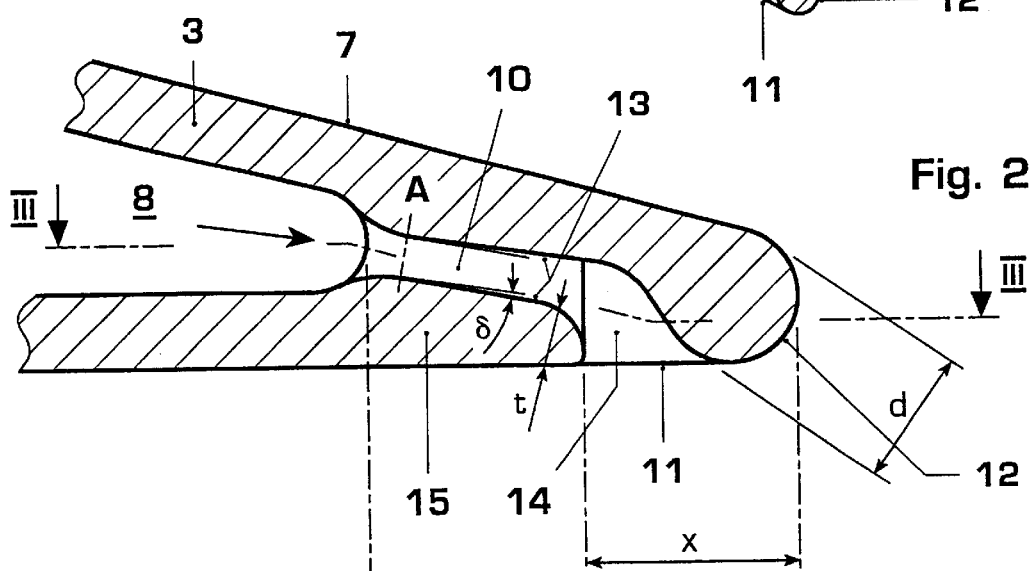
FIG. 2 is an enlarged cross-section view of the airfoil of FIG. 1 at the trailing edge section according to the invention.
Figure 3:
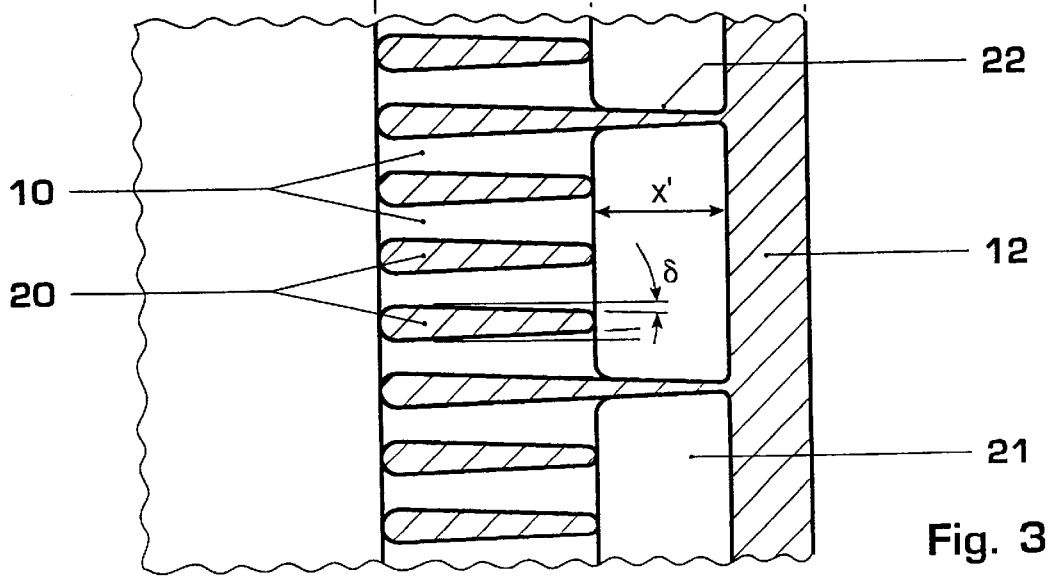
FIG. 3 is a spanwise cross-sectional view of the airfoil along the line III—III in FIG. 2 with the exit ports for the cooling air onto the exit plenum.

FIG. 2 shows the region of the trailing edge 9 of the airfoil in detail. The suction sidewall 3 is shaped according to the invention in order to optimize the cooling effectiveness in the tip region of the airfoil. The suction sidewall 3 comprises at its tip a rounded portion 12 with a cross-section as shown in the figure that is part of a circle with a diameter d whereas the part of the circle is at least a semi-circle. Preferably the part of the circle extends less than 180°. The diameter d has for example a size of 0.08 inches. The exit passage 10 from the hollow space 8 follows at first a straight line up to the bend 14. Here there is a first portion, a metering section, where the sidewalls 13 of the exit passages extend parallel to the exit passage axis. After a distance approximately three times the diameter of the exit passage 10, which is indicated by the point A, the inner walls 13 of the exit passage 10 are slightly diffused in all dimensions with respect to the axis of the passage. The diffusion of the passage walls 13 is indicated by the angle δ, which preferably is less than 3°. The range for the angle δ is chosen in view of the ratio of the distance between the point A and the end of the pressure side lip to the diameter of the exit passage. This ratio is approximately three or less. A greater diffusion angle would induce a higher loss coefficient and may induce internal flow separation. In addition, a small diffusion angle allows the implementation of thinner short ribs 20 (as shown in FIG. 3) which reduces the flow blockage.

The ratio of the pressure side lip thickness t to the exit passage height or diameter is in this design greater than 0.7. For example, the lip thickness t is equal or greater than 0.035 inch and the exit passage height approximately 0.025 inch.

The exit passage 10 has in its straight region a cross-section perpendicular to the cooling fluid flow that is oblong or rectangular with rounded corners. This shape is sometimes also known as a "race-track"-shape. The cross-section can also be circular or circular along one portion of the exit channel and oblong along another portion. As the exit passage reaches the inside of the rounded portion 12 of the trailing edge it follows a bend 14 which directs it toward the pressure side of the airfoil. The pressure sidewall 3 has a pressure side lip 15 with a thickness t, for example of about 0.035 inches or more. These dimensions are for an airfoil with a length of approximately 2.5 inches. The thickness t together with the thickness d of the pressure side lip determines the thickness of the trailing edge and the aerodynamics of the airfoil in view of the turbine performance. This airfoil thickness is comparable to or smaller than the airfoil thickness of airfoils of the state of the art. The cutback distance x, however, achieved by the rounded shape of the trailing edge tip and the bend in exit passage according to the invention is shortened to 0.12 inches or less. In particular, an airfoil with a pressure side lip thickness t of 0.035 inch and a trailing edge thickness d of 0.08 inch has a cutback distance half as large as the airfoil presented in U.S. Pat. No. 4,601,638 and with the same dimensions for d and t. This effects a greater and improved cooling effectiveness over the state of the art. The exit passage 10 finally leads to the exit port 11 with a width x' approximately equal to or less than x−(d/2) where x−(d/2) is 0.08 inch.

The cooling fluid flows from the hollow space through the exit passage 10 where its velocity is reduced due to the diffusion of the passage 10. As the fluid reaches the bend 14 it impinges on the inner surface 5 of the suction sidewall 3 thereby cooling that sidewall. It then follows the inside surface of the rounded portion 12 reducing the temperature of the tip by film cooling.

FIG. 3 shows in a longitudinal cross-sectional view along the line III-III of the airfoil 1 with several supporting ribs 22 placed every four exit passages 10. Short supporting ribs 20 formed by the pressure side lips 15 separate the exit passages 10. The cooling fluid flows through the exit port 11 with width x' into an exit plenum 21 on the pressure side of the airfoil 1. In this exit plenum 21 between the supporting ribs 22 the cooling fluid can diffuse in axial as well as radial directions. Its velocity is thus further reduced which yields a highly effective film cooling in the region of the exit plenum 21 and around the rounded tip portion 12 of the airfoil.

What is claimed is:

1. An airfoil for a gas turbine, comprising:
    a pressure sidewall and a suction sidewall, an interior cavity between the pressure and suction sidewalls for receiving cooling fluid in the cavity;
    the airfoil including a trailing edge having a plurality of exit ports in the pressure sidewall, and including a plurality of exit passages each having a channel height and communicating between the cavity and the exit ports;
    the pressure sidewall having a pressure side lip that leads to the exit ports of the exit passages, a cutback distance being defined as the distance between the tip of the trailing edge and the end of the pressure side lip; and
    the suction sidewall terminates at the trailing edge in a rounded portion in the shape in cross section of a circle, the trailing edge having in the region of its circular shape a trailing edge diameter, the rounded portion extends to the pressure sidewall including the exit ports in the pressure sidewall and beyond into the exit passages, thereby forming a curved bend in the exit passages adjacent the exit ports, and including an exit plenum where the cooling fluid diffuses and cools the airfoil trailing edge.

2. An airfoil according to claim 1, wherein the sidewalls of the exit passages are diffused by a diffusion angle (δ) with respect to the passage axes, where δ<3°.

3. An airfoil according to claim 1, wherein a plurality of supporting ribs are arranged substantially parallel to the exit passages.

4. An airfoil according to claim 1, wherein the exit passages have a cross section perpendicular to their axes that is circular, rectangular or oblong, and the sidewalls of the exit passages are diffused in the direction of the fluid flow.

5. An airfoil according to claim 1, wherein the cutback distance (x) has a length less than 0.10 inch.

6. An airfoil according to claim 1, wherein the pressure side lip thickness (t) is equal to or greater than 0.035 inches.

7. An airfoil according to claim 1, the airfoil trailing edge diameter (d) is equal or greater than 0.08 inch.

8. An airfoil according to claim 1, wherein an exit port width (x') forms the distance between the end of the pressure side lip and the point where the trailing edge portion reaches a tangent line to the pressure side of the airfoil, the exit port width (x') being equal to or less than 0.08 inch.

9. An airfoil according to claim 1, wherein the exit passages each have a channel height measured in the same plane as a pressure side lip thickness (t), and the pressure side lip thickness (t) to channel height ratio is greater than 0.7.

10. An airfoil according to claim 9, wherein the outer surface of the pressure sidewall is coated with a protective coating for protection against erosion, corrosion and oxidation with a thickness in the range of 0.014 inch to 0.018 inch.

* * * * *